United States Patent
Kurotsu

(10) Patent No.: US 9,083,841 B2
(45) Date of Patent: Jul. 14, 2015

(54) IMAGE READING APPARATUS EFFICIENTLY ILLUMINATING LIGHT

(71) Applicant: Kyocera Document Solutions Inc., Osaka (JP)

(72) Inventor: Yoshihiko Kurotsu, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/465,857

(22) Filed: Aug. 22, 2014

(65) Prior Publication Data

US 2015/0055196 A1 Feb. 26, 2015

(30) Foreign Application Priority Data

Aug. 22, 2013 (JP) ................................. 2013-172099

(51) Int. Cl.
*H04N 1/04* (2006.01)
*H04N 1/028* (2006.01)
*H04N 1/00* (2006.01)

(52) U.S. Cl.
CPC ............. *H04N 1/02815* (2013.01); *H04N 1/00* (2013.01); *H04N 1/04* (2013.01)

(58) Field of Classification Search
CPC ........ H04N 1/02815; H04N 1/00; H04N 1/04
USPC .................................. 358/475, 498, 497, 496
See application file for complete search history.

(56) References Cited

U.S. PATENT DOCUMENTS

| 2002/0057469 | A1* | 5/2002 | Yushiya et al. | 358/509 |
| 2009/0296172 | A1* | 12/2009 | Iwatsuka | 358/509 |
| 2013/0128322 | A1* | 5/2013 | Joh et al. | 358/475 |

FOREIGN PATENT DOCUMENTS

JP 2008-216409 A 9/2008

* cited by examiner

*Primary Examiner* — Houshang Safaipour
(74) *Attorney, Agent, or Firm* — James W. Judge

(57) ABSTRACT

An image reading apparatus for reading an image of an original document includes a document placement surface, an illumination unit, a light-receiving unit, and an illumination control unit. The illumination unit includes: a first light guiding body in a bar shape extended in a first direction configured to irradiate a light to the original document along a second direction, a second light guiding body arranged at a distance from the first light guiding body configured to irradiate a light to the original document along a third direction, a pair of first light sources emits illuminating lights to be injected into the first incident surfaces, a pair of second light sources emits illuminating lights to be injected into the second incident surface. The illumination control unit is configured to control light-emitting operations of the first light source and the second light source corresponding to the reading mode.

13 Claims, 9 Drawing Sheets

US 9,083,841 B2

IMAGE READING APPARATUS EFFICIENTLY ILLUMINATING LIGHT

INCORPORATION BY REFERENCE

This application is based upon, and claims the benefit of priority from, corresponding Japanese Patent Application No. 2013-172099 filed in the Japan Patent Office on Aug. 22, 2013, the entire contents of which are incorporated herein by reference.

BACKGROUND

Unless otherwise indicated herein, the description in this section is not prior art to the claims in this application and is not admitted to be prior art by inclusion in this section.

In an image reading apparatus such as a scanner and a copier, an illumination device is mounted. The illumination device irradiates a light to a document for optically reading the image of the document placed on a reading surface. Nowadays, as a light source for this illumination device, a light emitting diode (LED) is used. The LED has an advantage of high luminous efficiency. In this illumination device, it is necessary to illuminate the document in a line shape. However, since the LED is a point light source, a bar-shaped light guiding body and the LED are combined to generate a line-shaped illuminating light. The light guiding body includes an incident surface and a strip-shaped emission surface. The incident surface is arranged in an end portion of the light guiding body, and receives the illuminating light emitted from the LED. The emission surface extends along the longitudinal direction of the light guiding body, and causes emission of the illuminating light.

There is a technique that includes one light guiding body and a reflective plate disposed to extend parallel to the light guiding body, in order to illuminate the document. The light guiding body includes two emission surfaces. The light emitted from one emission surface is directly irradiated to the document. The light emitted from the other emission surface is reflected at the reflective plate, and then irradiated to the document sheet. As a result, the lights from the two directions intersecting with each other are irradiated to the document.

SUMMARY

An image reading apparatus for reading an image of an original document according to the disclosure includes a document placement surface, an illumination unit, a light-receiving unit, and an illumination control unit. On the document placement surface, the original document is to be placed. The illumination unit is arranged to face the document placement surface. The illumination unit is configured to irradiate an illuminating light to the original document. The light-receiving unit is configured to receive a reflected light from the original document and convert the reflected light into an electrical signal. The illumination control unit is configured to control the illumination unit corresponding to a reading mode where the image of the original document is read. The illumination unit includes a first light guiding body in a bar shape, a second light guiding body, a pair of first light sources, and a pair of second light sources. The first light guiding body is in a bar shape extended in a first direction that includes: a pair of first incident surfaces arranged in both end portions of the first light guiding body in the first direction, the first incident surface being configured to receive a light injected along the first direction; and a first emission surface disposed to extend along the first direction, the first emission surface being configured to emit the light in a second direction intersecting with the first direction, the first light guiding body being configured to irradiate a light to the original document along the second direction. The second light guiding body is arranged at a distance from the first light guiding body, the second light guiding body being in a bar shape extended in the first direction, the second light guiding body including: a pair of second incident surfaces arranged in both end portions of the second light guiding body in the first direction, the second incident surface being configured to receive a light injected along the first direction; and a second emission surface disposed to extend along the first direction, the second emission surface being configured to emit the light in a third direction intersecting with the first direction, the second light guiding body being configured to irradiate a light to the original document along the third direction. The pair of first light sources is arranged to face the pair of the respective first incident surfaces of the first light guiding body to emit illuminating lights to be injected into the first incident surfaces. The pair of second light sources is arranged to face the pair of the respective second incident surfaces of the second light guiding body to emit illuminating lights to be injected into the second incident surface. The illumination control unit is configured to control light-emitting operations of the first light source and the second light source corresponding to the reading mode.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
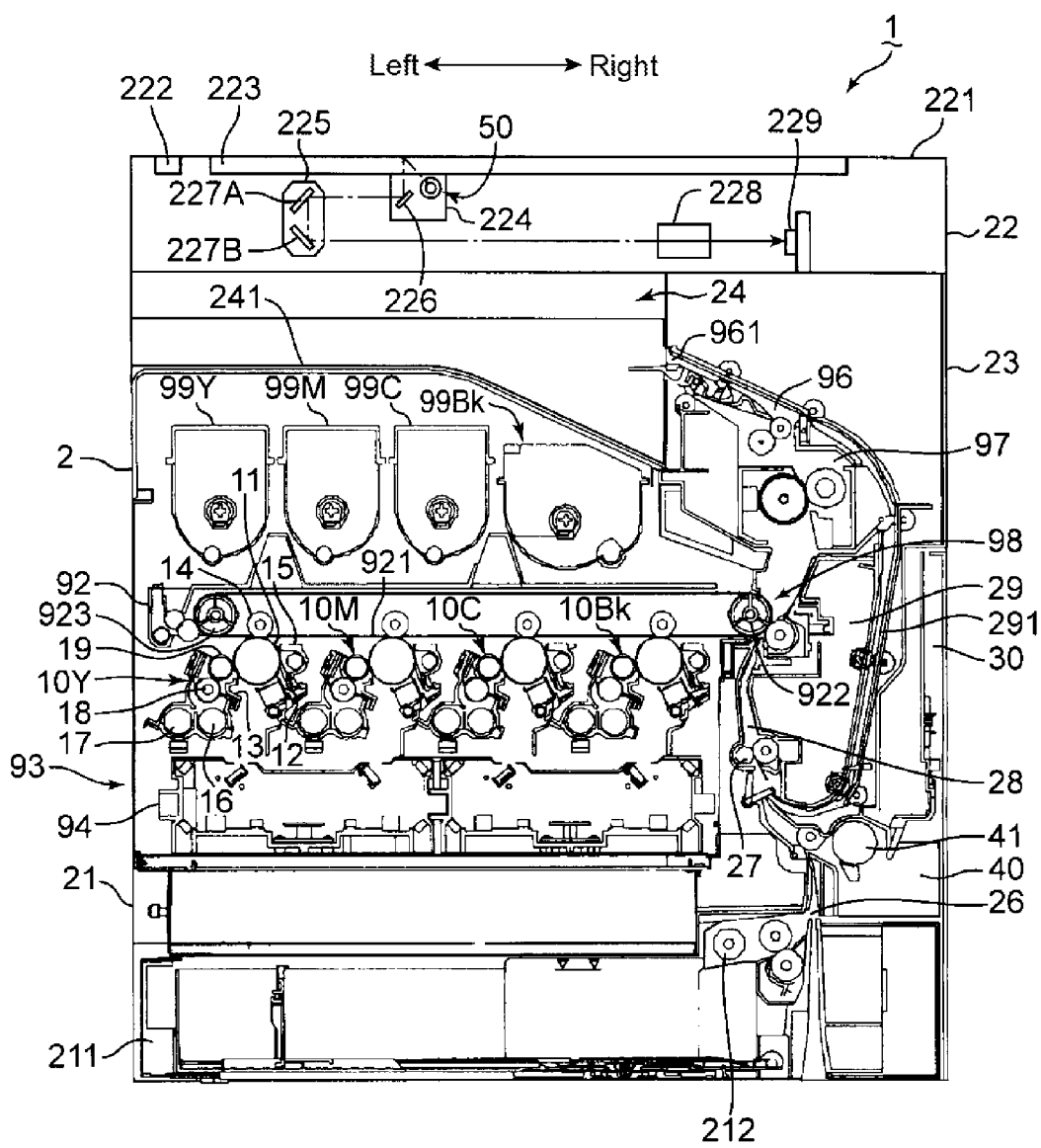
FIG. 1 illustrates schematic configurations of an image reading apparatus and an image forming apparatus according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure in detail based on the drawings. FIG. 1 illustrates the internal structure of an image forming apparatus 1 that includes an image reading apparatus 22 according to one embodiment of the disclosure. Here, as the image forming apparatus 1, for example, what is called a copier of an in-barrel paper discharge type is illustrated. The apparatus to which the image reading apparatus 22 according to the disclosure is applied is not limited to the copier, and may be, for example, a scanner apparatus, a facsimile apparatus, or a multi-functional peripheral.

The image forming apparatus 1 includes a housing 2. The housing 2 has a chassis structure in an approximately rectangular parallelepiped shape, and has an in-barrel space (in-barrel paper discharge unit 24). The housing 2 includes a lower chassis (apparatus main body 21), an upper chassis (image reading apparatus 22), and a connection chassis 23. The lower chassis houses various devices for image formation. The upper chassis is arranged on the upper side of the apparatus main body 21. The connection chassis 23 connects the apparatus main body 21 and the image reading apparatus 22 together. The image reading apparatus 22 optically reads the image of a document sheet (original document) to generate image data corresponding to the document image. The apparatus main body 21 performs a process for forming a toner image on a sheet based on the image data. Between the apparatus main body 21 and the image reading apparatus 22, the in-barrel paper discharge unit 24 is disposed. To the in-barrel paper discharge unit 24, the sheet after the image formation is discharged. The connection chassis 23 is arranged on a side of the right side surface of the housing 2, and includes a discharge port 961 for discharging a sheet to the in-barrel paper discharge unit 24.

Inside of the apparatus main body 21, toner containers 99Y, 99M, 99C, and 99Bk, an intermediate transfer unit 92, an image forming unit 93, an exposure unit 94, and a sheet feed cassette 211 are housed in this order from the left.

The image forming unit 93 forms an image on a sheet based on the image data output from the image reading apparatus 22. The image forming unit 93 includes four image formation units 10Y, 10M, 10C, and 10Bk for forming a full-color toner image. The image formation units 10Y, 10M, 10C, and 10Bk form respective toner images of yellow (Y), magenta (M), cyan (C), and black (Bk). Each of the image formation units 10Y, 10M, 10C, and 10Bk includes a photoreceptor drum 11 and a charger 12, a developing device 13, a primary transfer roller 14, and a cleaning device 15 arranged in the peripheral area of this photoreceptor drum 11.

The photoreceptor drum 11 rotates around its own axis. On the circumference surface of the photoreceptor drum 11, an electrostatic latent image and a toner image are formed. The charger 12 uniformly charges the surface of the photoreceptor drum 11. The circumference surface of the photoreceptor drum 11 after the charging is exposed by the exposure unit 94, and thus an electrostatic latent image is formed.

The developing device 13 supplies the toner to the circumference surface of the photoreceptor drum 11 so as to develop the electrostatic latent image formed on the photoreceptor drum 11. The developing device 13 includes agitation rollers 16 and 17, a magnetic roller 18, and a developing roller 19. The agitation rollers 16 and 17 circulatively convey the two-component developer while agitating it, so as to charge the toner. On the circumference surface of the magnetic roller 18, a two-component developer layer is supported. On the circumference surface of the developing roller 19, a toner layer is supported. The toner layer is formed by delivery and receipt of the toner due to the difference in electric potential between the magnetic roller 18 and the developing roller 19. The toner on the developing roller 19 is supplied to the circumference surface of the photoreceptor drum 11, so as to develop the electrostatic latent image.

The primary transfer roller 14 sandwich an intermediate transfer belt 921 included in the intermediate transfer unit 92 so as to form a nip portion together with the photoreceptor drum 11, and primarily transfers the toner image on the photoreceptor drum 11 onto the intermediate transfer belt 921. The cleaning device 15 cleans the circumference surface of the photoreceptor drum 11 after the transferring of the toner image.

The yellow toner container 99Y, the magenta toner container 99M, the cyan toner container 99C, and the black toner container 99Bk reserve toners of respective colors. The toners of the respective colors are supplied through a supply path (not illustrated) to the developing devices 13 of the image formation units 10Y, 10M, 10C, and 10Bk corresponding to the respective colors of Y, M, C, and Bk.

The exposure unit 94 includes various kinds of optical system equipment, for example, a light source, a polygon mirror, a reflective mirror, and a deflecting mirror. The exposure unit 94 irradiates the light based on the image data of the document image to the respective circumference surfaces of the photoreceptor drums 11 disposed in the image formation units 10Y, 10M, 10C, and 10Bk, so as to form an electrostatic latent image.

The intermediate transfer unit 92 includes an intermediate transfer belt 921, a drive roller 922, and a driven roller 923. On the intermediate transfer belt 921, respective toner images from the plurality of photoreceptor drums 11 are superimposed (in primary transfer). The superimposed toner images are secondarily transferred to a sheet to be supplied from the sheet feed cassette 211 or a sheet feed tray 30 in a secondary transfer unit 98. The drive roller 922 and the driven roller 923 that circularly drive the intermediate transfer belt 921 are rotatably supported by the apparatus main body 21.

The sheet feed cassette 211 houses a sheet bundle formed by laminating a plurality of sheets. In the upper portion of the sheet feed cassette 211 on the right edge side, a pickup roller 212 is arranged. Driving the pickup roller 212 feeds the sheet in the uppermost layer of the sheet bundle within the sheet feed cassette 211 one by one, so as to carry the fed sheet in a carry-in conveyance path 26. Here, on the right-side surface of the apparatus main body 21, a paper feeding unit 40 is disposed. The paper feeding unit 40 includes the sheet feed tray 30 for manual paper feeding. The sheet placed on the sheet feed tray 30 is carried in the carry-in conveyance path 26 by the driving of a paper feed roller 41 of the paper feeding unit 40.

At the downstream side of the carry-in conveyance path 26, a sheet conveyance path 28 is disposed. The sheet conveyance path 28 is extended to the discharge port 961 via the secondary transfer unit 98, a fixing unit 97, and a sheet discharge unit 96, which are described later. The upstream portion of the sheet conveyance path 28 is formed between the inner wall formed in the apparatus main body 21 and the inner wall forming the internal surface of a reverse conveying unit 29. Here, the outer surface of the reverse conveying unit 29 forms one surface of a reverse conveyance path 291. In the reverse conveyance path 291, a sheet is inversely conveyed at the time of duplex printing. Further, at the upstream side of the secondary transfer unit 98 in the sheet conveyance path 28, a registration roller pair 27 is arranged. The sheet is once stopped by the registration roller pair 27 for skew correction. Subsequently, the sheet is sent out to the secondary transfer unit 98 at predetermined timing for image transfer.

The connection chassis 23 houses the fixing unit 97 and the sheet discharge unit 96 inside. The fixing unit 97 includes a fixing roller and a pressure roller. In the secondary transfer unit 98, the fixing unit 97 heats and applies pressure to the sheet on which the toner image is secondarily transferred, so as to perform a fixing process. The sheet with the color image after the fixing process is discharged from the discharge port 961 toward the in-barrel paper discharge unit 24 by the sheet discharge unit 96.

The image reading apparatus 22 includes a first contact glass 222 and a second contact glass 223. The first contact glass 222 and the second contact glass 223 are fit into a top surface 221 of the upper chassis. When an automatic document feed (ADF, which is not illustrated) is arranged on the image reading apparatus 22, the first contact glass 222 is disposed for reading a document sheet to be automatically fed from the ADF. On the second contact glass 223, a document sheet is placed by a user. The second contact glass 223 is disposed for reading the placed document sheet. In this case, the image reading apparatus 22 may include a document cover 22A (see FIG. 10) instead of the ADF. Above the second contact glass 223, the document cover 22A can be opened with respect to the top surface portion of the image reading apparatus 22. When the document cover 22A is set to an open state, a document sheet is placed on the second contact glass 223 by the user. When the document cover 22A is set to a closed state, the document sheet is pressed and fixed by the document cover 22A.

The image reading apparatus 22 includes a first moving carriage 224, a second moving carriage 225, a condensing lens unit 228, and an imaging device 229 (light-receiving unit), which are housed within the upper chassis. The first moving carriage 224 includes an illumination device 50, which will be described later, and a first reflective mirror 226. The second moving carriage 225 includes a second reflective mirror 227A and a third reflective mirror 227B for reversing the optical path.

The first moving carriage 224 reciprocates in the right-left direction (sub-scanning direction) along the inferior surfaces of the first contact glass 222 and the second contact glass 223. The second moving carriage 225 reciprocates by a movement amount that is a half of the movement amount of the first moving carriage 224 in the right-left direction. In an automatic-feeding mode in which a document sheet is automatically fed from the automatic document feed (not illustrated), the first moving carriage 224 moves to a position immediately below the first contact glass 222 and then is set to a resting state. In this resting state, a light is emitted from the illumination device 50 toward the document sheet. On the other hand, in a manual placement mode in which a document sheet is placed on the second contact glass 223, the first moving carriage 224 moves from a position immediately below the left end of the second contact glass 223 toward the right side corresponding to the size of the document sheet. During this movement, a light is emitted from the illumination device 50 toward the document sheet. The second moving carriage 225 moves to the right side by the movement amount that is a half of the movement amount of the first moving carriage 224, following the first moving carriage 224.

The illumination device 50 irradiates an illuminating light in a line shape extended in the main-scanning direction (front-rear direction) to the document sheet (original document) as an irradiation target object. The illumination device 50 is arranged to face the first contact glass 222 or the second contact glass 223. Specifically, the illumination device 50 emits the illuminating light to the document sheet that passes above the first contact glass 222 by automatic feeding or the document sheet that is placed on the second contact glass 223 by manual placement, for optically reading the document-sheet image. The first reflective mirror 226 reflects the reflected light of the illuminating light that is emitted toward the document sheet by the illumination device 50 toward the second reflective mirror 227A of the second moving carriage 225.

The second reflective mirror 227A reflects the reflected light that is reflected by the first reflective mirror 226 toward the third reflective mirror 227B. The third reflective mirror 227B reflects the reflected light toward the condensing lens unit 228. The condensing lens unit 228 forms a light image of the reflected light that is reflected by the third reflective mirror 227B on the imaging surface of the imaging device 229. The imaging device 229 is formed of a charge coupled device (CCD) and similar member, and receives the reflected light, and photoelectrically converts the received light into an analog electrical signal. This analog electrical signal is converted into a digital electrical signal by an A/D converter circuit (not illustrated). Subsequently, the digital electrical signal is input to the above-described exposure unit 94 as the image data.

Figure 2:
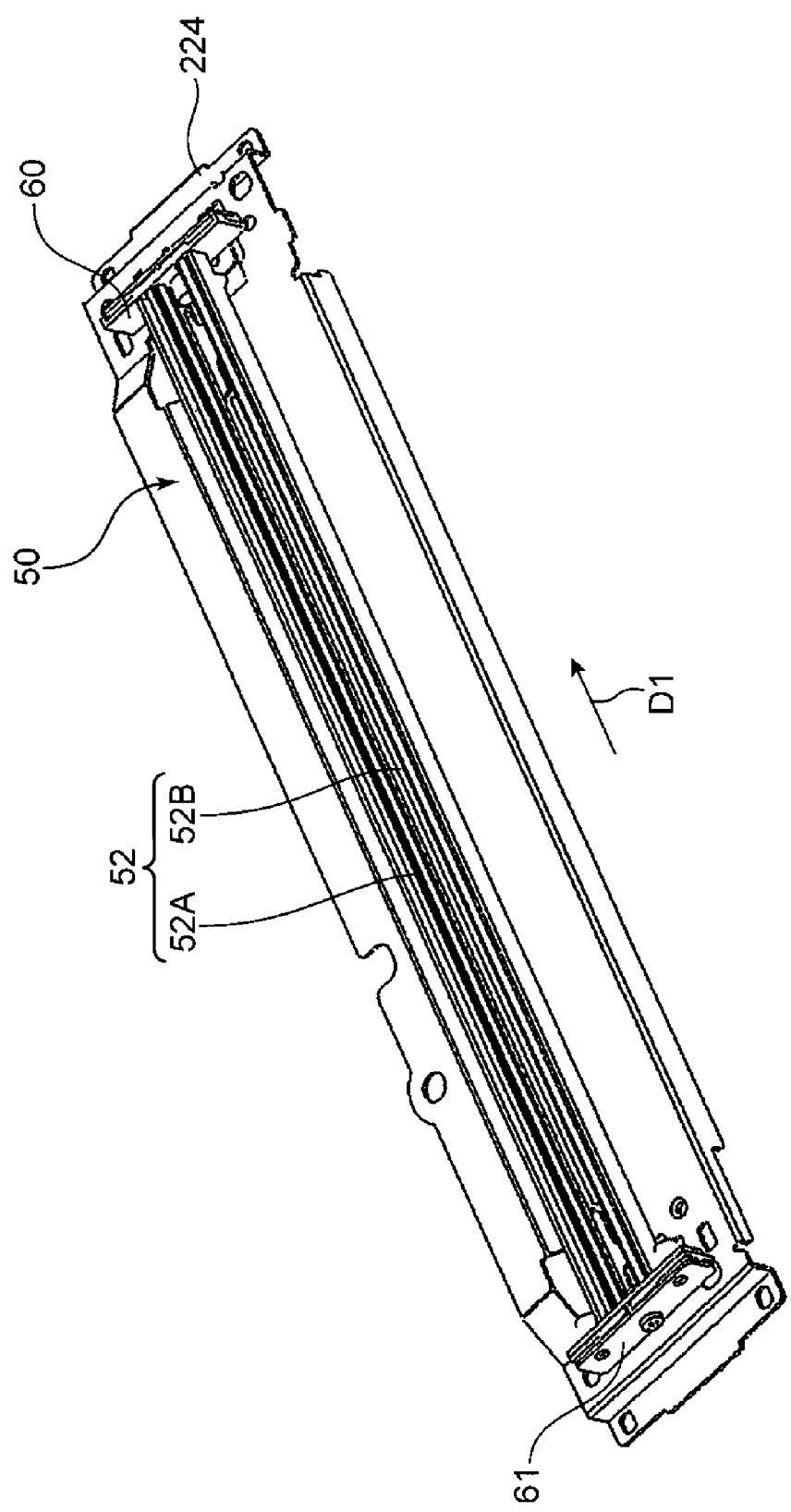
FIG. 2 illustrates an illumination device according to the one embodiment.
Figure 3:
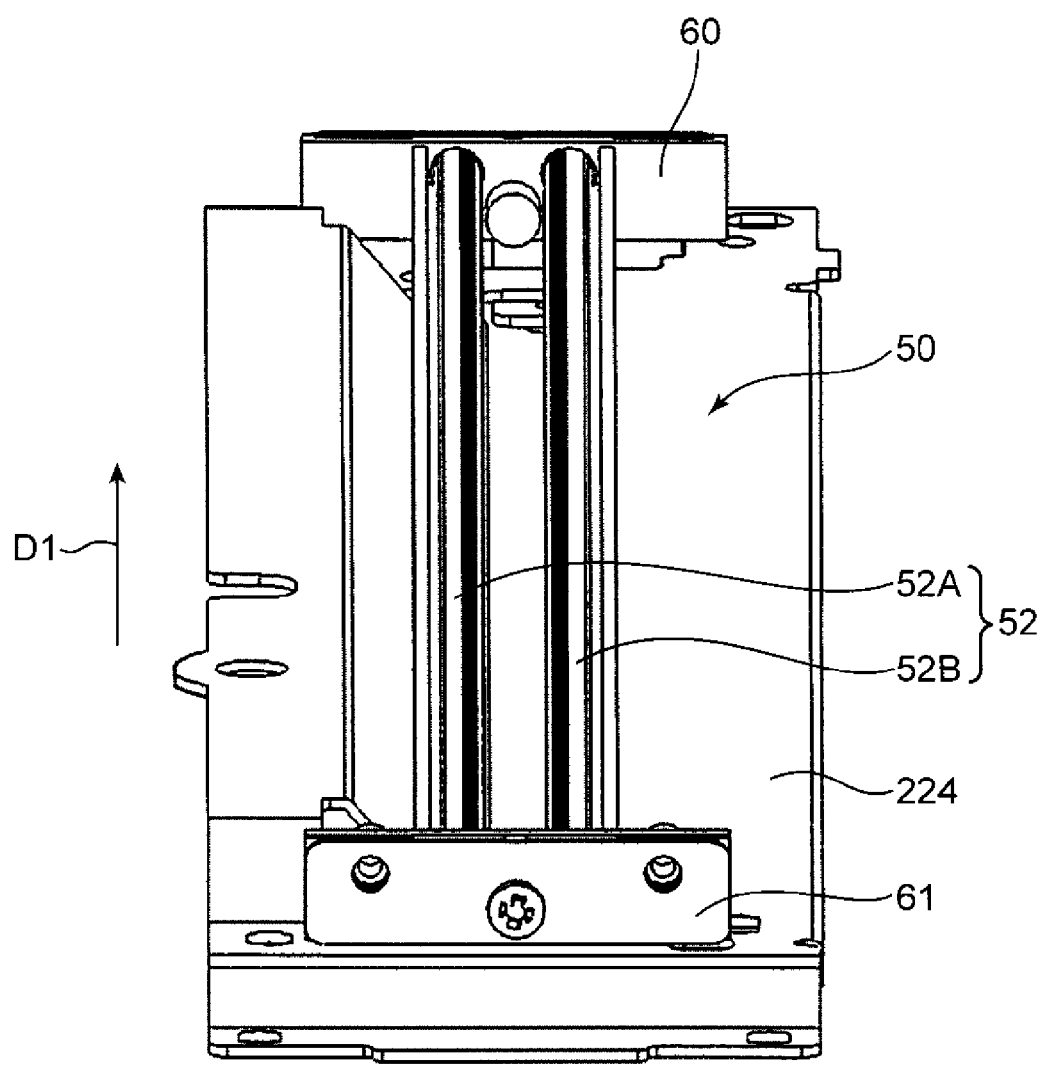
FIG. 3 illustrates the illumination device according to the one embodiment.
Figure 4:
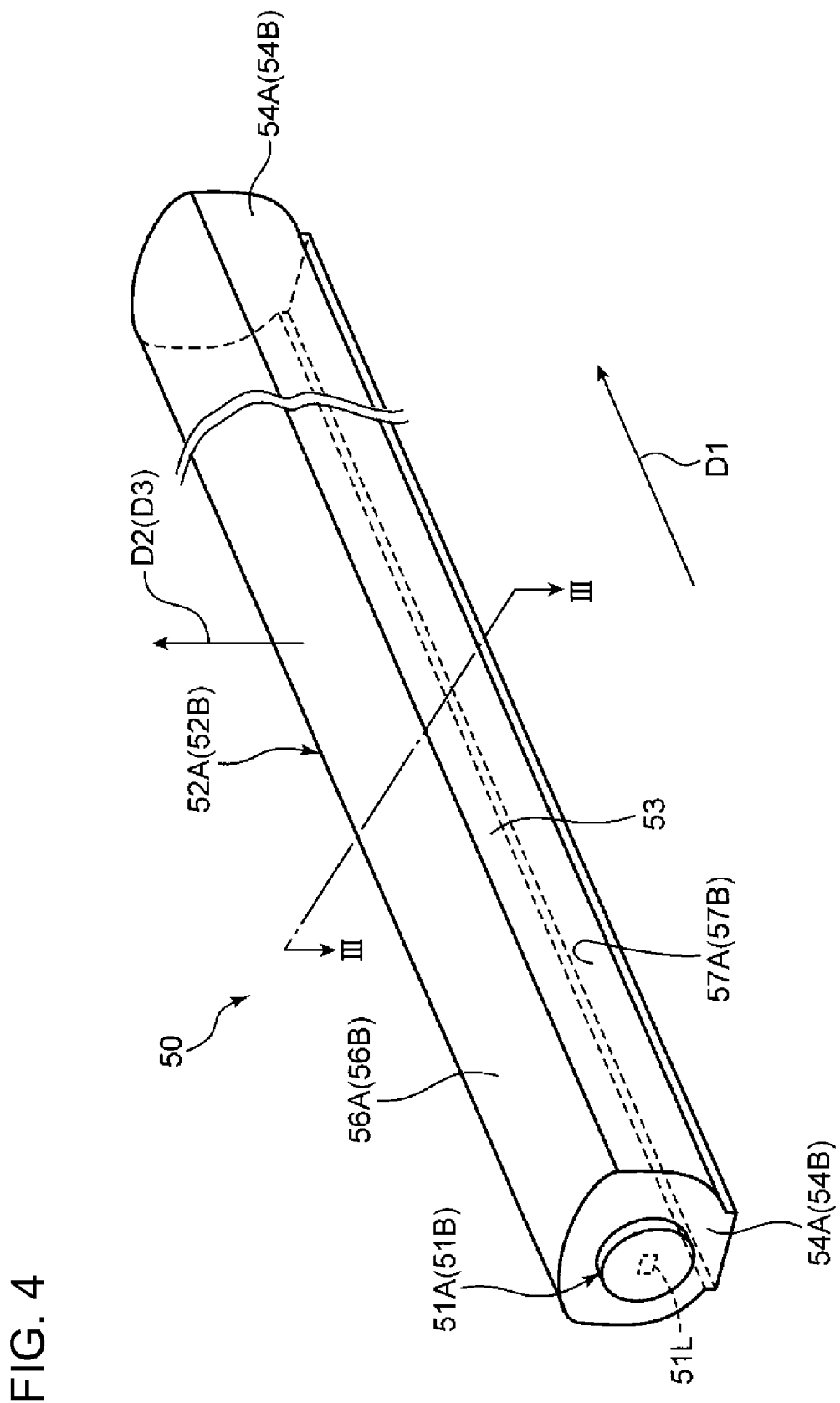
FIG. 4 illustrates a light guiding body according to the one embodiment.
Figure 5:
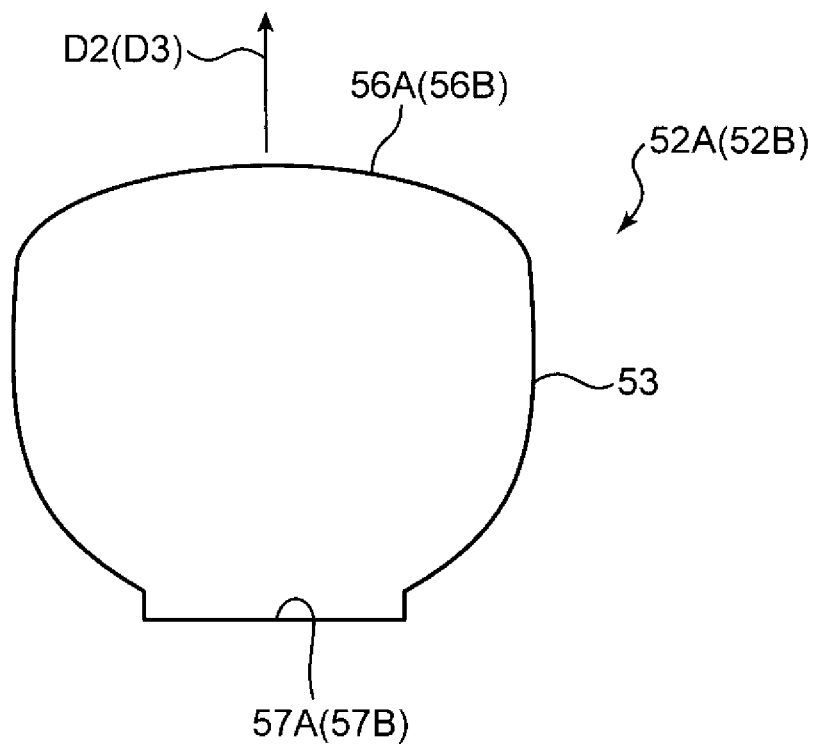
FIG. 5 illustrates a cross section of the light guiding body according to the one embodiment.
Figure 6:
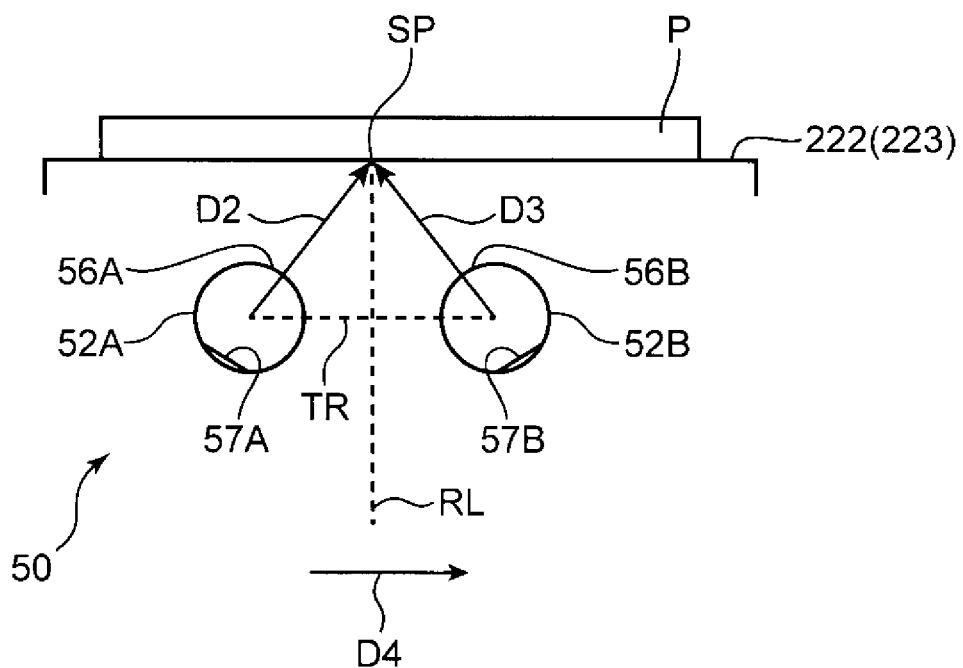
FIG. 6 illustrates a schematic cross section of the illumination device according to the one embodiment.
Figure 7:
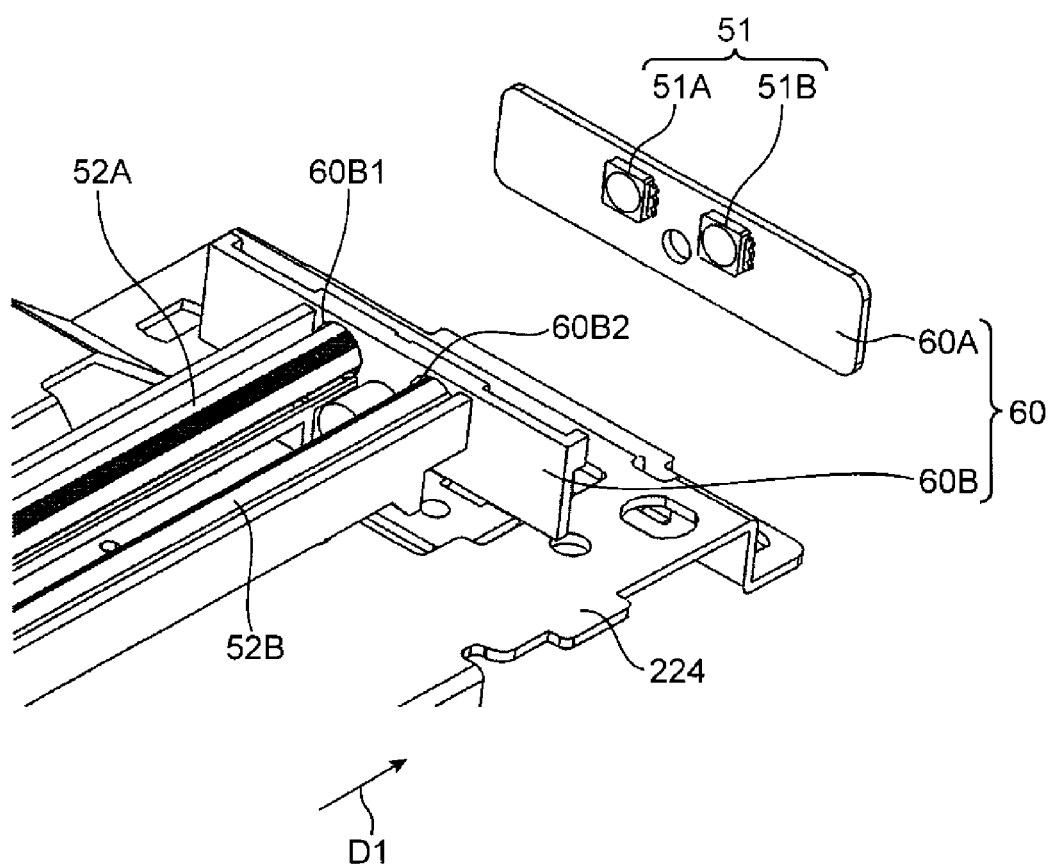
FIG. 7 perspectively illustrates an exploded schematic view of the illumination device according to the one embodiment.
Figure 8:
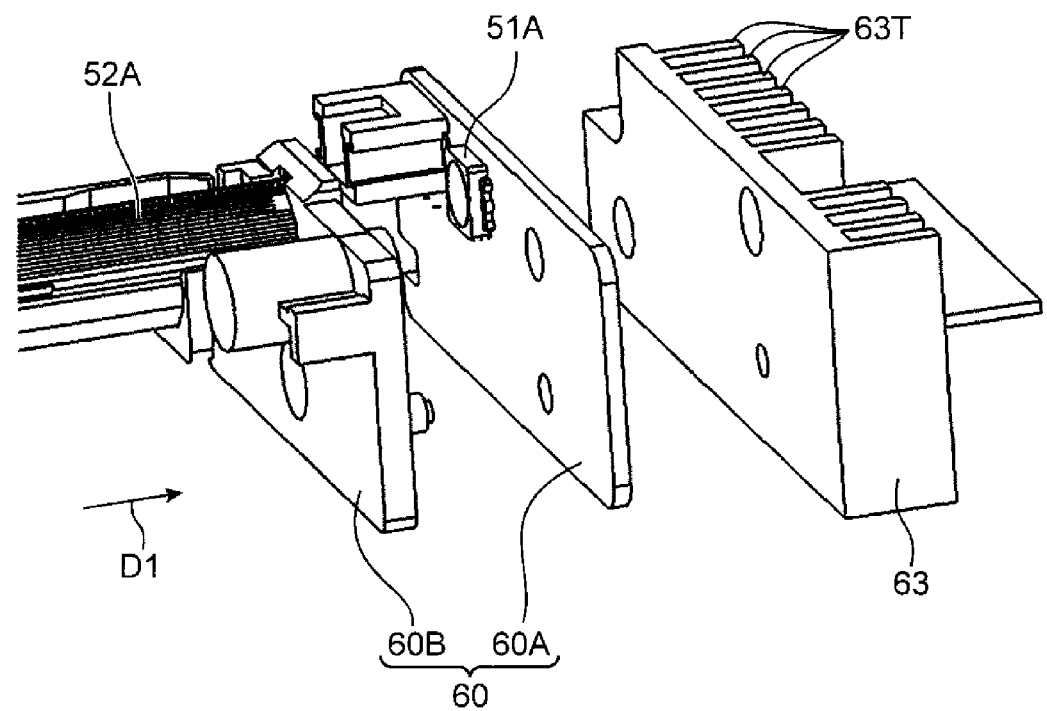
FIG. 8 perspectively illustrates an exploded schematic view of the illumination device according to the one embodiment.

The following describes the detail of the illumination device 50 according to the embodiment of the disclosure. FIG. 2 and FIG. 3 each perspectively illustrate the illumination device 50 on the first moving carriage 224. FIG. 4 perspectively illustrates a first light guiding body 52A (or a second light guiding body 52B) of the illumination device 50. FIG. 5 illustrates a cross section of the first light guiding body 52A (or a second light guiding body 52B). Here, in FIG. 4 and FIG. 5, the reference numerals for the second light guiding body 52B are illustrated in brackets. Further, FIG. 6 illustrates schematic cross sections of the respective light guiding bodies of the illumination device 50. FIG. 7 and FIG. 8 each perspectively illustrate an exploded schematic view of the illumination device 50.

The illumination device 50 irradiates a light while setting a focal position to the document sheet (irradiation target object) arranged on the first contact glass 222 or the second contact glass 223 (predetermined arrangement surface). The illumination device 50 is arranged on the first moving carriage 224 along the main-scanning direction (the first direction illustrated by an arrow D1 in FIG. 2 and FIG. 3).

The illumination device 50 includes a light source 51 (see FIG. 7) and a light guiding body 52. The light guiding body 52 causes the propagation of the illuminating light emitted from the light source 51 and converts this illuminating light into an illuminating light in a line shape, and then emits the converted illuminating light. The light source 51 includes a first light source 51A and a second light source 51B. The light guiding body 52 includes a first light guiding body 52A and a second light guiding body 52B.

The first light guiding body 52A has a bar shape extended in the first direction. The first light guiding body 52A includes a first incident surface 54A and a first emission surface 56A (see FIG. 4). The first incident surface 54A is arranged in the end portion of the first light guiding body 52A in the first direction. Along the first direction, a light is injected into the first incident surface 54A. In this embodiment, a pair of the first incident surfaces 54A are arranged on both end portions of the first light guiding body 52A in the first direction. The first emission surface 56A is disposed to extend along the first direction. The first emission surface 56A emits the light in a second direction (illustrated by an arrow D2 in FIG. 4 and FIG. 6) intersecting with the first direction. Then, the first light guiding body 52A irradiates the light to the document sheet from the second direction.

The second light guiding body 52B is arranged at a distance from the first light guiding body 52A. The second light guiding body 52B has a bar shape extended in the first direction. The second light guiding body 52B includes a second incident surface 54B and a second emission surface 56B. The second incident surface 54B is arranged in the end portion of the second light guiding body 52B in the first direction. Along the first direction, a light is injected into the second incident surface 54B. In this embodiment, a pair of the second incident surfaces 54B are arranged on both end portions of the second light guiding body 52B in the first direction. The second emission surface 56B is disposed to extend along the first direction. The second emission surface 56B emits the light in a third direction (illustrated by an arrow D3 in FIG. 4 and FIG. 6), which will be described later, intersecting with the first direction. Then, the second light guiding body 52B irradiates the light to the document sheet from the third direction.

The light source 51 (the first light source 51A and the second light source 51B) has a thin circular plate shape, and includes a white light emitting diode (LED) 51L, which emits a white-colored light (see FIG. 4).

In this embodiment, the pair of the first light sources 51A and the pair of the second light sources 51B are respectively arranged in both the end portions of the first light guiding body 52A and both the end portions of the second light guiding body 52B. That is, the pair of the first light sources 51A are arranged to face the pair of the respective first incident surfaces 54A in the first light guiding body 52A. The pair of the first light sources 51A emit illuminating lights to be injected into the first incident surfaces 54A. The pair of the second light sources 51B are arranged to face the pair of the respective second incident surfaces 54B in the second light guiding body 52B. The pair of the second light sources 51B emit illuminating lights to be injected into the second incident surfaces 54B.

Next, a description will be given of the structures of the first light guiding body 52A and the second light guiding body 52B with reference to FIG. 4 and FIG. 5. Here, in this embodiment, the second light guiding body 52B has a configuration similar to that of the first light guiding body 52A. The first light guiding body 52A and the second light guiding body 52B are different from each other in arrangement in the illumination device 50. Accordingly, in FIG. 4 and FIG. 5, the structure of the first light guiding body 52A will be mainly described as an example.

The first light guiding body 52A is formed of a translucent resin material such as acrylic resin. The first light guiding body 52A has a bar shape extended in the main-scanning direction (first direction), and includes a main unit 53 and the pair of the first incident surfaces 54A. The main unit 53 guides illuminating lights emitted from the first light sources 51A. The pair of the first incident surfaces 54A are both of the end surfaces of the main unit 53 in the first direction, and the illuminating lights are injected into these first incident surfaces 54A. The above-described pair of the first light sources 51A have light-emitting surfaces arranged to face the pair of the respective first incident surfaces 54A. In FIG. 4, the first light source 51A on the distal end side in the first direction is not illustrated in the drawing.

The first light guiding body 52A further includes a first emission surface 56A and a first reflecting surface 57A. The first emission surface 56A is arranged on the top surface side (on a side facing the first and second contact glasses 222 and 223) of the main unit 53. The first reflecting surface 57A faces this first emission surface 56A, and is arranged on the inferior surface side of the main unit 53. The first emission surface 56A is a surface that extends along the main-scanning direction (first direction) on the top surface of the main unit 53, has a predetermined width in the direction perpendicular to the main-scanning direction, and emits the illuminating light toward the first and second contact glasses 222 and 223 (document sheet). The direction in which the illuminating light is emitted from the first emission surface 56A is defined as the second direction (illustrated by the arrow D2 in FIG. 4 to FIG. 6). The first reflecting surface 57A is a strip-shaped surface that similarly extends in the main-scanning direction, and reflects the illuminating light propagating in the main unit 53 toward the first emission surface 56A. The first emission surface 56A has a relatively shallow convex curved surface in the direction intersecting with the main-scanning direction. On the other hand, the first reflecting surface 57A is a flat surface. The first reflecting surface 57A has a large number of micro-prisms (not illustrated). The prism reflects a light toward the first emission surface 56A.

As described above, the second light guiding body 52B also has a structure similar to that of the first light guiding body 52A. That is, the second light guiding body 52B also includes the main unit 53. The first incident surface 54A, the first emission surface 56A, and the first reflecting surface 57A of the first light guiding body 52A respectively correspond to the second incident surface 54B, the second emission surface 56B, a the second reflecting surface 57B of the second light guiding body 52B. Here, the direction in which the illuminating light is emitted from the second emission surface 56B is defined as the third direction (illustrated by the arrow D3 in FIG. 4 to FIG. 6). Thus, the first light guiding body 52A and the second light guiding body 52B have the same shape and structure. Thus, the two light guiding bodies are commonalized.

Additionally, with reference to FIG. 2 and FIG. 8, the illumination device 50 includes a first plate 60, a second plate 61, and a heat dissipation unit 63 (see FIG. 8). The first plate 60 and the second plate 61 are plate-shaped members disposed upright from the first moving carriage 224 toward the upper side. The first plate 60 supports the first light guiding body 52A and the second light guiding body 52B in the first direction on one end side. The second plate 61 supports the first light guiding body 52A and the second light guiding body 52B in the first direction on the other end side.

With reference to FIG. 7 and FIG. 8, the first plate 60 includes an eleventh plate 60A and a twelfth plate 60B. The eleventh plate 60A and the twelfth plate 60B are plate-shaped members arranged to face each other. The eleventh plate 60A supports the first light source 51A and the second light source 51B. The twelfth plate 60B supports the first light guiding body 52A and the second light guiding body 52B. Furthermore, the twelfth plate 60B faces the first light source 51A and the second light source 51B, and exposes the first incident surface 54A and the second incident surface 54B (see FIG. 4). Specifically, the twelfth plate 60B includes a first opening portion 60B1 and a second opening portion 60B2. The respective one end sides of the first light guiding body 52A and the second light guiding body 52B are inserted into the first opening portion 60B1 and the second opening portion 60B2. As a result, the first incident surface 54A and the second incident surface 54B are exposed with respect to the eleventh plate 60A side. Mounting the eleventh plate 60A with the twelfth plate 60B causes arrangement in which the first light source 51A and the second light source 51B are arranged to respectively face the first incident surface 54A and the second incident surface 54B. Here, the second plate 61 has a configuration similar to that of the first plate 60.

The heat dissipation unit 63 (see FIG. 8) is arranged in contact with the eleventh plate 60A. The heat dissipation unit 63 includes a heat dissipation rib 63T. The heat dissipation rib 63T increases the surface area of the heat dissipation unit 63. Accordingly, the heat dissipation unit 63 functions as a heat sink. When the heat dissipation unit 63 is mounted on the first plate 60, the heat generated in association with light emission of the first light source 51A and the second light source 51B transfers from the eleventh plate 60A to the heat dissipation unit 63. Then, the heat is discharged from the heat dissipation rib 63T to the outside of the illumination device 50.

Next, a description will be given of the direction of the irradiation light according to this embodiment with reference to FIG. 6. The first light guiding body 52A and the second light guiding body 52B are arranged to be inclined by a predetermined angle, so as to have respective emission surfaces facing each other. As described above, the first light guiding body 52A irradiates the light of the first light source 51A to a document sheet P from the second direction. The second light guiding body 52B irradiates the light of the second light source 51B to the document sheet P from the third direction. That is, in the cross section intersecting with the first direction illustrated in FIG. 6, the second direction is the direction from one document placement surface side toward the document sheet P with respect to the normal line RL perpendicular to the first contact glass 222 or the second contact glass 223 (document placement surface). The third direction is the direction from another document placement surface side toward the document sheet P with respect to the normal line RL. This ensures stable irradiation of the light to the document sheet P from both sides of the normal line RL. Further, in this embodiment, in the cross section, a triangular shape TR connecting the first light guiding body 52A, the second light guiding body 52B, and a focal point SP of the irradiation light is an isosceles triangle in which the focal point SP is the vertex. Accordingly, respective distributions of the lights to be irradiated to the document sheet P from the first light guiding body 52A and the second light guiding body 52B are line-symmetric with respect to each other in the cross section intersecting with the first direction. Accordingly, even when the respective lights to be irradiated from the first light guiding body 52A and the second light guiding body 52B overlap each other, a uniform light can be irradiated to the document sheet P. In other words, it is restricted that reduction of the luminescence level on one document sheet P side with reference to the normal line RL more than the luminescence level on another document sheet P side. Here, in another embodiment, the triangular shape TR connecting the first light guiding body 52A, the second light guiding body 52B, and the focal point SP of the irradiation light may be an equilateral triangle.

In the above-described configuration, the first direction is the main-scanning direction of the image reading apparatus 22. In the cross section intersecting with the first direction, the direction (illustrated by an arrow D4 in FIG. 6) from the first light guiding body 52A toward the second light guiding body 52B is the sub-scanning direction. The document sheet P as the irradiation target object is irradiated with lights from the two light guiding bodies (the first light guiding body 52A and the second light guiding body 52B). In each of the two light guiding bodies, two light sources (the first light source 51A and the second light source 51B) are arranged. Accordingly, the document sheet P can be irradiated with lights from the two different directions. This ensures irradiation of light to the document sheet P at a higher luminescence level compared with the case where the light is irradiated from one light guiding body. Additionally, the luminescence amount of one light source is allowed to be small. This ensures reduction in heat amount generated by each light source. Accordingly, this reduces thermal distortion of the light source 51, the light guiding body 52, and the peripheral member due to the heat. The illumination device 50 can reciprocate in the sub-scanning direction. This causes stably reading the image of the document sheet P that expands in the main-scanning direction and the sub-scanning direction.

Figure 9:
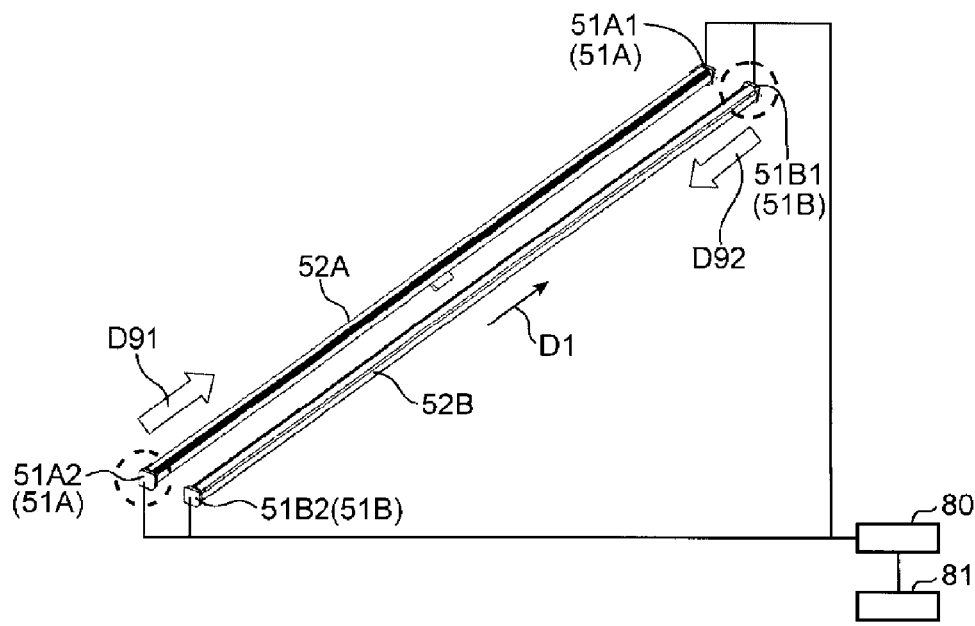
FIG. 9 perspectively illustrates the light guiding body of the illumination device according to the one embodiment.
Figure 10:
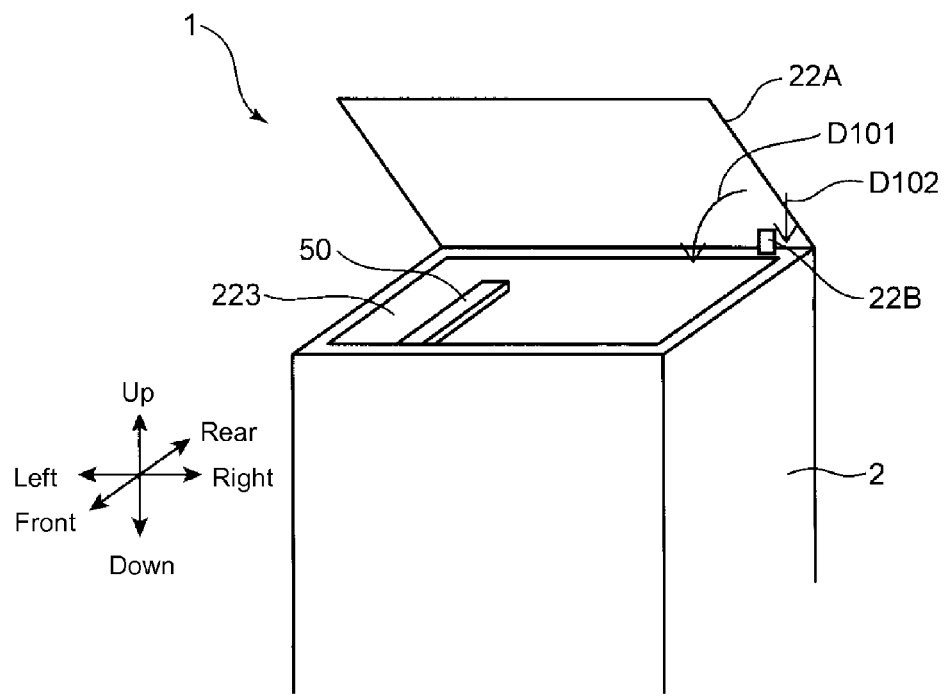
FIG. 10 perspectively illustrates a schematic state where a document cover is being closed in the image forming apparatus according to the one embodiment.
Figure 11:
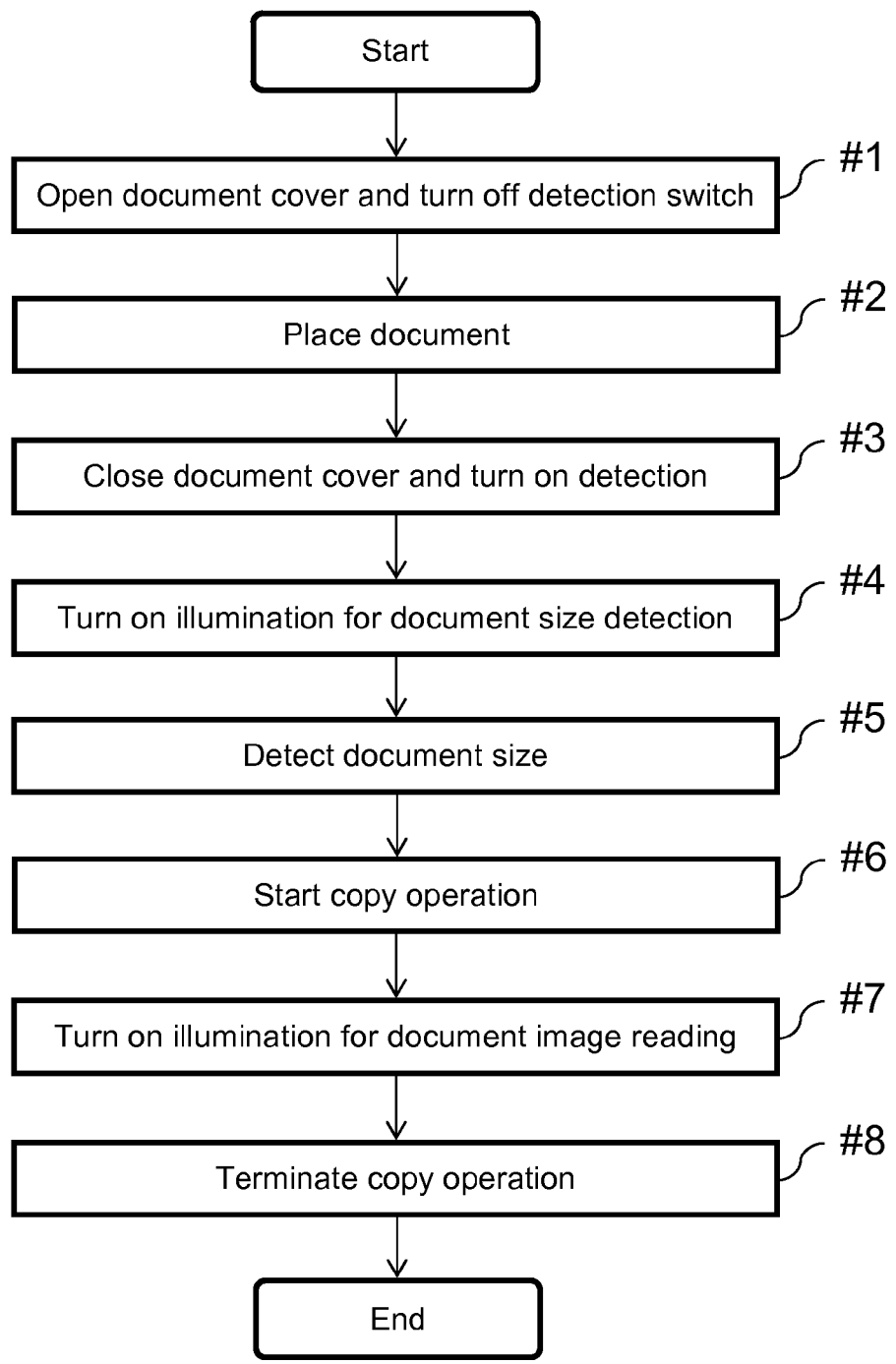
FIG. 11 illustrates a procedure for light emission by the illumination device in the image forming apparatus according to the one embodiment.

Next, in the image forming apparatus 1 according to this embodiment, a description will be given of a configuration in which the illumination device 50 is used. FIG. 9 perspectively illustrates the first light guiding body 52A and the second light guiding body 52B of the illumination device 50 according to this embodiment. FIG. 10 perspectively illustrates a state where the document cover 22A is being closed in the image forming apparatus 1. FIG. 11 illustrates a procedure for light emission of the illumination device 50 in the image forming apparatus 1.

With reference to FIG. 9, among the above-described first light sources 51A, the first light source 51A arranged on one end side in the first direction (the direction illustrated by the arrow D1 in FIG. 9) is defined as an eleventh light source 51A1 while the first light source 51A arranged on the other end side in the first direction is defined as a twelfth light source 51A2. Similarly, among the second light sources 51B, the second light source 51B arranged on one end side in the first direction is defined as a twenty-first light source 51B1 while the second light source 51B arranged on the other end side in the first direction is defined as a twenty-second light source 51B2. The light emission of the eleventh light source 51A1, the twelfth light source 51A2, the twenty-first light source 51B1, and the twenty-second light source 51B2 are controlled by a control unit 80.

The control unit 80 includes a central processing unit (CPU), a read only memory (ROM) that stores a control program, a random access memory (RAM) used as a work area of the CPU, and similar member. The control unit 80 executes the control program stored in the ROM by the CPU so as to function to control the light-emitting operation of the respective light sources described above.

In this embodiment, the control unit 80 controls the light-emitting operation of the plurality of light sources in the illumination device 50 corresponding to the reading mode of the image reading apparatus 22. This ensures irradiation of light to the original document at an appropriate luminescence level corresponding to the reading mode. Furthermore, this ensures reduction in electric power consumption in association with irradiation of light. Table 1 shows the relationship between the respective reading modes and the number (the number of LEDs to light) of light sources to emit light in the illumination device 50. In each reading mode, the image reading apparatus 22 reads the image of the document sheet corresponding to the image forming operation of the image forming apparatus 1.

TABLE 1

| Reading Mode | Number of Lighting LEDs | Remarks |
|---|---|---|
| Color | 4 | |
| High Resolution | 4 | 600 dpi or More |
| Black and White | 2 | |
| Low Resolution | 2 | 300 dpi or Less |

In this embodiment, the image reading apparatus 22 has a color mode (full-color reading mode), a black-and-white mode (single-color reading mode), a high-resolution reading mode, and a low-resolution reading mode. These reading modes are selected by the user through an operation unit 81 (see FIG. 9) included in the image forming apparatus 1, a personal computer connected to the image forming apparatus 1, or similar unit.

The color mode is a mode in which the image of the document sheet is read as a full-color image of four colors. In the color mode, the imaging device 229 (see FIG. 1) photoelectrically converts the image of each color into an electrical signal. Accordingly, it is necessary to irradiate an intense light to the document sheet. On the other hand, the black-and-white mode is a mode in which the image of the document sheet is read as a black-and-white image (black image). In the black-and-white mode, the imaging device 229 photoelectrically converts a black-and-white image into an electrical signal. Accordingly, in the black-and-white mode, it is not necessary to irradiate an intense light to the document sheet compared with the color mode. Here, the black-and-white mode is not limited to the mode in which the image of the document sheet is read as a single color image of black (Bk). In another embodiment, the black-and-white mode may be a mode in which the image of the document sheet is read as single color images with each of the colors of yellow (Y), magenta (M), and cyan (C).

In this embodiment, in the color mode, the control unit 80 (see FIG. 9) causes light emissions of all of the pair of the first light sources 51A and the pair of the second light sources 51B. That is, in FIG. 9, light emissions of all of the eleventh light source 51A1, the twelfth light source 51A2, the twenty-first light source 51B1, and the twenty-second light source 51B2 are generated. As a result, the illuminating lights enter into the first light guiding body 52A and the second light guiding body 52B from both sides in the first direction (main-scanning direction), and then the illuminating lights are irradiated to the document sheet. Accordingly, the document sheet is irradiated with an intense light, thus ensuring stably reading the full-color image.

On the other hand, in the black-and-white mode, the control unit 80 causes a light emission of the first light source 51A on one end side in the first direction among the pair of the first light sources 51A, and causes a light emission of the first light source 51A or the second light source 51B on the other end side in the first direction. As one example, with reference to FIG. 9, in the black-and-white mode, a light is emitted from the twelfth light source 51A2 on the one end side in the first direction among the first light sources 51A, and a light is emitted from the twenty-first light source 51B1 on the other end side in the first direction among the second light source 51B. As a result, the illuminating light enters into the first light guiding body 52A from the one end side in the first direction (illustrated by an arrow D91 in FIG. 9). From the other end side in the first direction, an illuminating light enters into the second light guiding body 52B (illustrated by an arrow D92 in FIG. 9). From the first light guiding body 52A and the second light guiding body 52B, the illuminating lights are irradiated to the document sheet. Accordingly, a light that has a lower intensity than that of the illuminating light in the color mode and is sufficient and required for reading the single color image is irradiated to the document sheet so as to stably read the single color image. Excessive light irradiation for reading the single color image is restricted so as to reduce the power consumption of the illumination device 50 in association with the light irradiation.

Here, in another embodiment, in the black-and-white mode, a light emission of the eleventh light source 51A1 may be generated instead of the twenty-first light source 51B1. Also in this case, the illuminating lights enter into the first light guiding body 52A from both sides in the first direction, and then the illuminating lights are irradiated to the document sheet. Here, in this case, an illuminating light does not enter into the second light guiding body 52B. Accordingly, a light that has a lower intensity than that of the illuminating light in the color mode and is sufficient and required for reading the single color image is irradiated to the document sheet so as to stably read the single color image. Excessive light irradiation for reading the single color image is restricted so as to reduce the power consumption of the illumination device 50. Here, as described above, when the light emissions of the twelfth light source 51A2 on the one end side of the first light guiding body 52A and the twenty-first light source 51B1 on the other end side of the second light guiding body 52B are generated, the light uniformity in the first direction is maintained while the two light guiding bodies are used. The usage frequencies of the first light guiding body 52A and the second light guiding body 52B are equalized. This realizes prolonging of the illumination device 50.

Further, with reference to Table 1, a high-resolution mode is a mode in which the image of the document sheet is read at a resolution equal to or more than 600 dpi (predetermined value). Accordingly, it is not necessary to irradiate an intense light to the document sheet. On the other hand, a low-resolution mode is a mode in which the image of the document sheet is read at a resolution equal to or less than 300 dpi (predetermined value). Accordingly, in the low-resolution mode, it is not necessary to irradiate an intense light to the document sheet compared with the high-resolution mode. Here, the low-resolution mode may be a mode in which the image of the document sheet is read at a resolution less than 600 dpi (predetermined value).

In this embodiment, in the high-resolution mode, the control unit 80 (see FIG. 9) causes light emissions of all the pair of the first light sources 51A and the pair of the second light sources 51B similarly to the color mode. As a result, the illuminating lights enter into the first light guiding body 52A and the second light guiding body 52B from both sides in the first direction (main-scanning direction). Subsequently, the illuminating lights are irradiated to the document sheet. Accordingly, an intense light is irradiated to the document sheet. This ensures stably reading the image of the document sheet at a high resolution.

On the other hand, in the low-resolution mode, similarly to the black-and-white mode, the control unit 80 causes a light emission of the first light source 51A on the one end side in the first direction among the pair of the first light sources 51A and causes a light emission of the first light source 51A or the second light source 51B on the other end side in the first direction. That is, with reference to FIG. 9, in the low-resolution mode, a light emission of the twelfth light source 51A2 on the one end side in the first direction among the first light sources 51A is generated, and a light emission of the twenty-first light source 51B1 on the other end side in the first direction among the second light sources 51B. Accordingly, a light that has a lower intensity than that of the illuminating light in the high-resolution mode and is sufficient and required for the image in the low-resolution mode is irradiated to the document sheet so as to stably read the image of the document sheet. Additionally, excessive light irradiation in reading of the image in the low-resolution mode is restricted so as to reduce the power consumption of the illumination device 50.

Further, in this embodiment, before the image of the document sheet is read, size detection for the document sheet is performed. With reference to FIG. 10, the image forming apparatus 1 includes a detection switch 22B in addition to the document cover 22A. The detection switch 22B is a switch that protrudes from the top surface portion of the housing 2 toward the upper side. As illustrated in FIG. 10, when the document cover 22A is opened with respect to the housing 2 toward the upper side, the detection switch 22B is protruded toward the upper side by a biasing spring (not illustrated). At this time, the detection switch 22B is set to an off-state so as to output a LOW signal (0V signal) to the control unit 80. On the other hand, when the document cover 22A is turned downward from the state illustrated in FIG. 10 (in the direction illustrated by an arrow D101 in FIG. 10) so as to be closed with respect to the housing 2, the document cover 22A presses the detection switch 22B (in the direction illustrated by an arrow D102 in FIG. 10). As a result, the detection switch 22B is depressed into the housing 2. At this time, the detection switch 22B is set to an on-state, and the control unit 80 outputs a HIGH signal (5V signal).

With reference to FIG. 11, when the document cover 22A is opened by the user, the detection switch 22B is set to the off-state (in step #1 in FIG. 11). Subsequently, the document sheet is placed on the second contact glass 223 by the user (in step #2). Subsequently, when the document cover 22A is closed by the user, the detection switch 22B is set to the on-state (in step #3). When the control unit 80 receives the HIGH signal from the detection switch 22B, the control unit 80 controls the illumination device 50 to perform an illumination operation for size detection on the document sheet (in step #4).

In this embodiment, in the illumination operation for size detection on the document sheet, the control unit 80 causes a light emission of the first light source 51A on the one end side in the first direction among the pair of the first light sources 51A, and causes a light emission of the first light source 51A or the second light source 51B on the other end side in the first direction. That is, similarly to the black-and-white mode, light emissions of the twelfth light source 51A2 and the twenty-first light source 51B1 in FIG. 9 are generated. Subsequently, the image reading apparatus 22 detects the size of the document sheet (in step #5).

In the size detection on the document sheet, it is only necessary to irradiate light to both end portions in the main-scanning direction (first direction) of the document sheet so as to detect the positions of both the end portions of the document sheet. Accordingly, it is not necessary to irradiate an intense light like the light in the color mode to the document sheet. Accordingly, as described above, each light emission of one light source from both end sides in the first direction causes irradiation of the light that is required and sufficient for size detection on the document sheet to the document sheet. Accordingly, the size detection is stably performed. Accordingly, excessive light irradiation in the size detection for the document sheet is restricted so as to reduce the power consumption of the illumination device 50.

In step #5 in FIG. 11, after the size of the document sheet is detected, the copy operation of the image forming apparatus 1 is started (in step #6). The control unit 80 controls the illumination device 50 corresponding to the preliminarily set reading mode so as to cause light emissions of the first light source 51A and the second light source 51B for image reading on the document sheet (in step #7). The reading mode at this time may be any of the plurality of the reading modes. The image reading apparatus 22 reads the image of the document sheet. Subsequently, the image of the sheet is formed based on image data to be output from the image reading apparatus 22 (in step #8).

Thus, in this embodiment, the control unit 80 causes a light emission of the first light source 51A on the one end side in the first direction among the pair of the first light sources 51A and causes a light emission of the first light source 51A or the second light source 51B on the other end side in the first direction so as to detect the size of the document sheet after the document sheet is placed on the second contact glass 223 before the image of the document sheet is read. Accordingly, the size of the document sheet can be detected while the electric power consumption is reduced in association with the light irradiation.

Preferred embodiments of the disclosure have been described above. This embodiment can cause the image reading apparatus 22 to irradiate the light to the document sheet at an appropriate luminescence level, and can reduce the electric power consumption in association with the light irradiation. As a result, the image is stably formed on the sheet based on the image data output from the image reading apparatus 22. Here, the disclosure is not limited to this, and can employ, for example, the following modified embodiments.

While in the above-described embodiment the case where the image reading apparatus 22 has four reading modes of the color mode, the black-and-white mode, the high-resolution mode, and the low-resolution mode has been described, the disclosure is not limited to this. The image reading apparatus 22 may employ a configuration that has a high-speed reading mode and a low speed reading mode. The high-speed reading mode is a mode in which the image of the document sheet is read at a reading speed equal to or more than a predetermined value. In this embodiment, the read speed of the document sheet in the high-speed reading mode corresponds to a printing speed equal to or more than 20 cpm (copies per minute) of the image forming apparatus 1 on which the image reading apparatus 22 is mounted. In other words, the high-speed reading mode is a mode in which the image reading apparatus 22 reads the images of 20 or more document sheets in A4 size per minute. On the other hand, the low speed reading mode is a mode in which the image of the document sheet is read at a reading speed less than the predetermined value. In this embodiment, the read speed of the document sheet in the low speed reading mode corresponds to a printing speed less than 20 cpm in the image forming apparatus 1 in which the image reading apparatus 22 is mounted. In other words, the low speed reading mode is a mode in which the image reading apparatus 22 reads the images of less than 20 document sheets in A4 size per minute.

In this modified embodiment, in the high-speed reading mode, the control unit 80 (see FIG. 9) causes light emissions of all the pair of the first light sources 51A and the pair of the second light sources 51B similarly to the color mode. As a result, after illuminating lights enter into the first light guiding body 52A and the second light guiding body 52B from both sides in the first direction (main-scanning direction), the illuminating lights are irradiated to the document sheet. Accordingly, an intense light is irradiated to the document sheet. This ensures stably reading the image of the document sheet in a short period.

On the other hand, in the low speed reading mode, similarly to the black-and-white mode, the control unit 80 cause a light emission of the first light source 51A on the one end side in the first direction among the pair of the first light sources 51A, and causes a light emission of the first light source 51A or the second light source 51B on the other end side in the first direction. That is, with reference to FIG. 9, in the low speed reading mode, a light emission of the twelfth light source 51A2 on the one end side in the first direction among the first light sources 51A is generated, and a light emission of the twenty-first light source 51B1 on the other end side in the first direction among the second light sources 51B is generated. Accordingly, a light that is that has a lower intensity than that of the illuminating light in the high-speed reading mode and is sufficient and required for reading the image in the low speed reading mode is irradiated to the document sheet so as to stably read the image of the document sheet. Additionally, excessive light irradiation in reading of the image in the low speed reading mode is restricted so as to reduce the power consumption of the illumination device 50.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus for reading an image of an original document, comprising:
    a document placement surface on which the original document is to be placed;
    an illumination unit arranged to face the document placement surface, the illumination unit being configured to irradiate an illuminating light to the original document;
    a light-receiving unit configured to receive a reflected light from the original document and convert the reflected light into an electrical signal; and
    an illumination control unit configured to control the illumination unit corresponding to a reading mode where the image of the original document is read; wherein:
    the illumination unit includes
        a first light guiding body in a bar shape extended in a first direction that includes: a pair of first incident surfaces arranged in both end portions of the first light guiding body in the first direction, the first incident surface being configured to receive a light injected along the first direction, and a first emission surface disposed to extend along the first direction, the first emission surface being configured to emit the light in a second direction intersecting with the first direction, the first light guiding body being configured to irradiate a light to the original document along the second direction,
        a second light guiding body arranged at a distance from the first light guiding body, the second light guiding body being in a bar shape extended in the first direction, the second light guiding body including: a pair of second incident surfaces arranged in both end portions of the second light guiding body in the first direction, the second incident surface being configured to receive a light injected along the first direction, and a second emission surface disposed to extend along the first direction, the second emission surface being configured to emit the light in a third direction intersecting with the first direction, the second light guiding body being configured to irradiate a light to the original document along the third direction,
        a pair of first light sources arranged to face the pair of the respective first incident surfaces of the first light guiding body to emit illuminating lights to be injected into the first incident surfaces, and
        a pair of second light sources arranged to face the pair of the respective second incident surfaces of the second light guiding body to emit illuminating lights to be injected into the second incident surface; and
    the illumination control unit is configured to
        control light-emitting operations of the first light source and the second light source corresponding to the reading mode, and
        cause a light emission of the first light source on the one end side in the first direction among the pair of first light sources and cause a light emission of one of the first light source or the second light source and the other end side in the first direction so as to detect a size of the original document after the original document is placed on the document placement surface before the image of the original document is read.

2. The image reading apparatus according to claim 1, wherein the illumination control unit is configured to:
    cause light emissions of all the pair of first light sources and the pair of second light sources in a full-color reading mode where the image of the original document is read as a full-color image; and
    cause a light emission of the first light source on one end side in the first direction among the pair of first light sources and cause a light emission of the first light source or the second light source on another end side in the first direction in a single-color reading mode where the image of the original document is read as a single color image.

3. The image reading apparatus according to claim 1, wherein the illumination control unit is configured to:
    cause light emissions of all the pair of first light sources and the pair of second light sources in a high-resolution reading mode where the image of the original document is read at a resolution equal to or more than a predetermined value; and
    cause a light emission of the first light source on one end side in the first direction among the pair of first light sources and cause a light emission of the first light source or the second light source on another end side in the first direction in a low-resolution reading mode where the image of the original document is read at a resolution less than the predetermined value.

4. The image reading apparatus according to claim 1, wherein the illumination control unit is configured to:
    cause light emissions of all the pair of first light sources and the pair of second light sources in a high-speed reading mode where the image of the original document is read at a reading speed equal to or more than a predetermined value; and
    cause a light emission of the first light source on one end side in the first direction among the pair of first light sources and cause a light emission of the first light source or the second light source on another end side in the first direction in a low speed reading mode where the image of the original document is read at a reading speed less than predetermined value.

5. The image reading apparatus according to claim 1, wherein:
    the first direction is a main-scanning direction while a direction from the first light guiding body toward the second light guiding body in a cross section intersecting with the first direction is a sub-scanning direction; and the illumination unit is movable in the sub-scanning direction.

6. An image forming apparatus, comprising:
the image reading apparatus according to claim 1; and
an image forming unit configured to form an image on a sheet based on image data to be output from the image reading apparatus.

7. An image reading apparatus for reading an image of an original document, comprising:
a document placement surface on which the original document is to be placed;
an illumination unit arranged to face the document placement surface, the illumination unit being configured to irradiate an illuminating light to the original document;
a light-receiving unit configured to receive a reflected light from the original document and convert the reflected light into an electrical signal; and
an illumination control unit configured to control the illumination unit corresponding to a reading mode where the image of the original document is read; wherein:
the illumination unit includes
a first light guiding body in a bar shape extended in a first direction that includes: a pair of first incident surfaces arranged in both end portions of the first light guiding body in the first direction, the first incident surface being configured to receive a light injected along the first direction, and a first emission surface disposed to extend along the first direction, the first emission surface being configured to emit the light in a second direction intersecting with the first direction, the first light guiding body being configured to irradiate a light to the original document along the second direction, wherein
in a cross section intersecting with the first direction, the second direction is a direction from one document placement surface side with respect to a normal line perpendicular to the document placement surface toward the original document,
a second light guiding body arranged at a distance from the first light guiding body, the second light guiding body being in a bar shape extended in the first direction, the second light guiding body including: a pair of second incident surfaces arranged in both end portions of the second light guiding body in the first direction, the second incident surface being configured to receive a light injected along the first direction, and a second emission surface disposed to extend along the first direction, the second emission surface being configured to emit the light in a third direction intersecting with the first direction, the second light guiding body being configured to irradiate a light to the original document along the third direction, wherein
in said cross section, the third direction is a direction from another document placement surface side with respect to the normal line toward the original document,
a pair of first light sources arranged to face the pair of the respective first incident surfaces of the first light guiding body to emit illuminating lights to be injected into the first incident surfaces, and
a pair of second light sources arranged to face the pair of the respective second incident surfaces of the second light guiding body to emit illuminating lights to be injected into the second incident surface;

the illumination control unit is configured to control light-emitting operations of the first light source and the second light source corresponding to the reading mode;
the original document is to be arranged at a focal position of lights to be emitted from the first light guiding body and the second light guiding body; and
in said cross section, a triangular shape connecting the first light guiding body, the second light guiding body, and the focal point is an isosceles triangle where the focal point is a vertex.

8. The image reading apparatus according to claim 7, wherein the illumination control unit is configured to:
cause light emissions of all the pair of first light sources and the pair of second light sources in a full-color reading mode where the image of the original document is read as a full-color image; and
cause a light emission of the first light source on one end side in the first direction among the pair of first light sources and cause a light emission of the first light source or the second light source on another end side in the first direction in a single-color reading mode where the image of the original document is read as a single color image.

9. The image reading apparatus according to claim 7, wherein the illumination control unit is configured to:
cause light emissions of all the pair of first light sources and the pair of second light sources in a high-resolution reading mode where the image of the original document is read at a resolution equal to or more than a predetermined value; and
cause a light emission of the first light source on one end side in the first direction among the pair of first light sources and cause a light emission of the first light source or the second light source on another end side in the first direction in a low-resolution reading mode where the image of the original document is read at a resolution less than the predetermined value.

10. The image reading apparatus according to claim 7, wherein the illumination control unit is configured to:
cause light emissions of all the pair of first light sources and the pair of second light sources in a high-speed reading mode where the image of the original document is read at a reading speed equal to or more than a predetermined value; and
cause a light emission of the first light source on one end side in the first direction among the pair of first light sources and cause a light emission of the first light source or the second light source on another end side in the first direction in a low speed reading mode where the image of the original document is read at a reading speed less than predetermined value.

11. The image reading apparatus according to claim 7, wherein the illumination control unit is configured to cause a light emission of the first light source on the one end side in the first direction among the pair of first light sources and cause a light emission of one of the first light source or the second light source and the other end side in the first direction so as to detect a size of the original document after the original document is placed on the document placement surface before the image of the original document is read.

12. The image reading apparatus according to claim 7, wherein:
the first direction is a main-scanning direction while a direction from the first light guiding body toward the second light guiding body in a cross section intersecting with the first direction is a sub-scanning direction; and the illumination unit is movable in the sub-scanning direction.

13. An image forming apparatus, comprising:
the image reading apparatus according to claim 7; and
an image forming unit configured to form an image on a sheet based on image data to be output from the image reading apparatus.

\* \* \* \* \*